Dec. 16, 1969  NOBORU TANAKA  3,484,047
PORTABLE MINIATURE SPRAYER
Filed Aug. 2, 1967  5 Sheets-Sheet 1

(a)

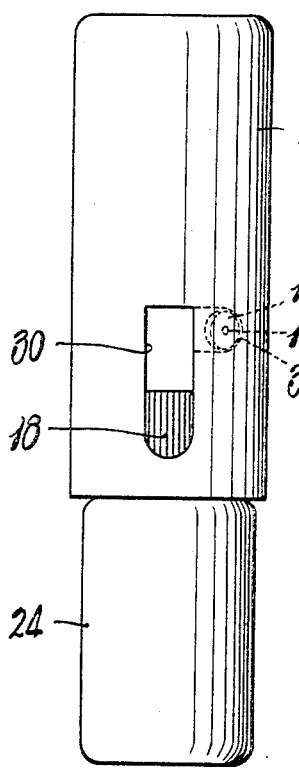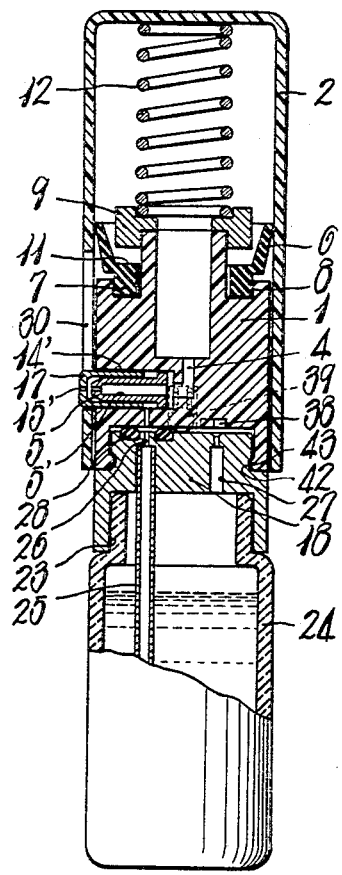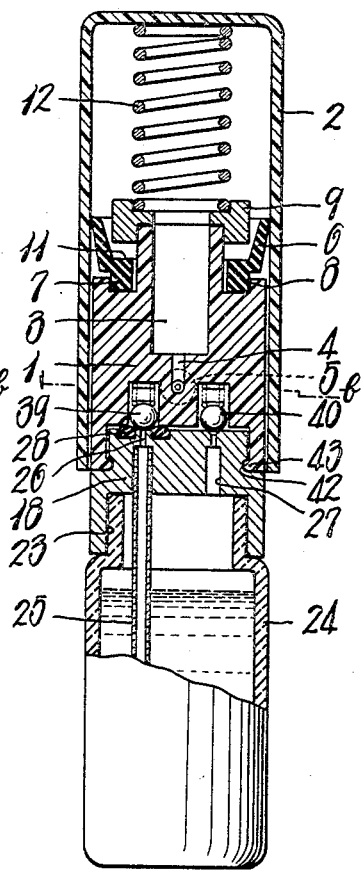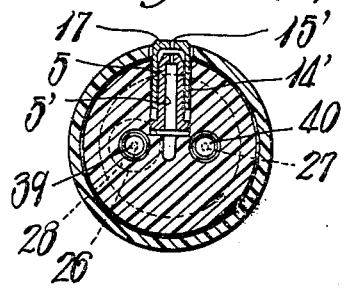

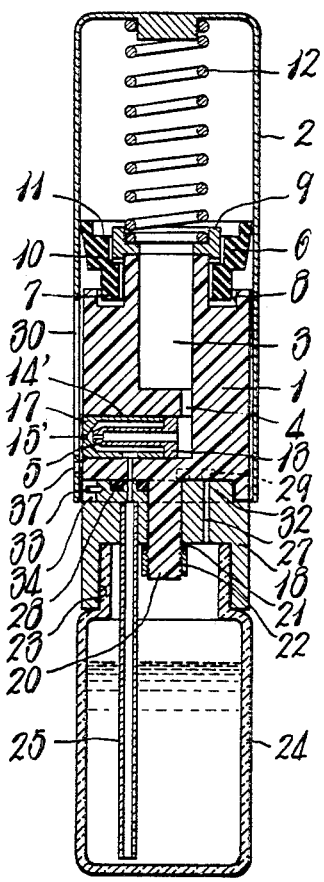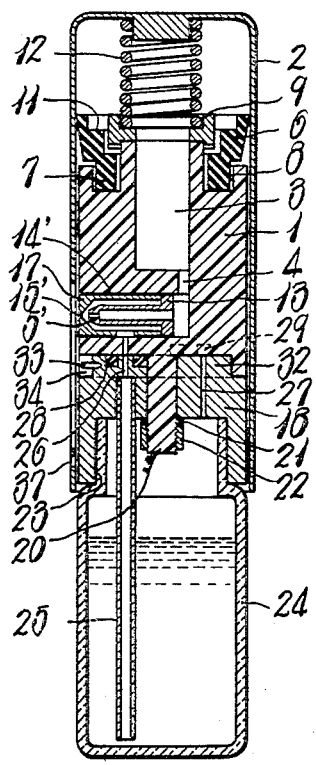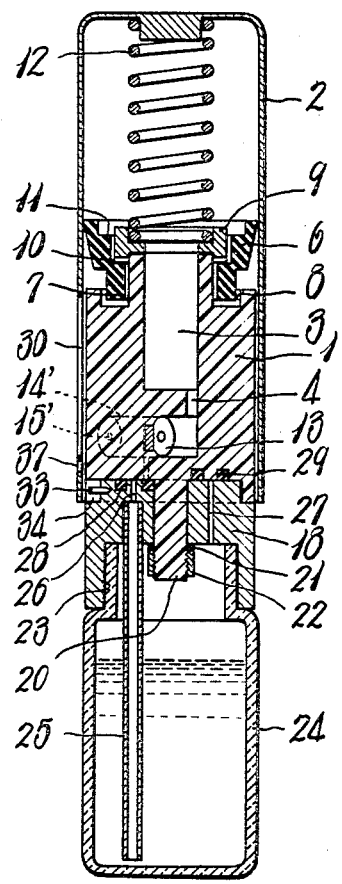

Dec. 16, 1969  NOBORU TANAKA  3,484,047
PORTABLE MINIATURE SPRAYER
Filed Aug. 2, 1967  5 Sheets-Sheet 4
Fig.10.(a)
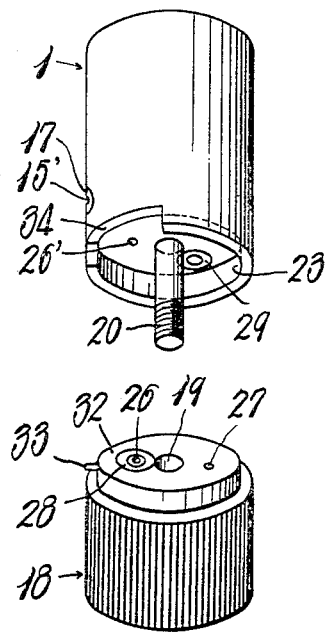
Fig.10(b)
Fig.11.(a)
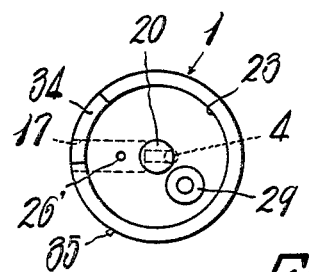
Fig.11(b)
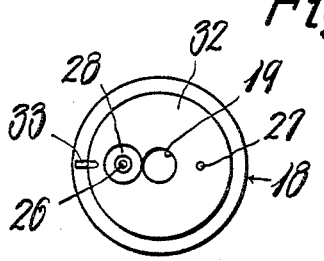
Fig.12.(a)  Fig.12(b)
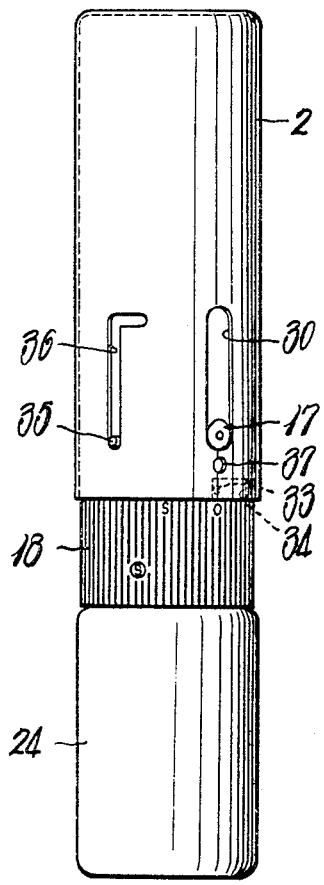 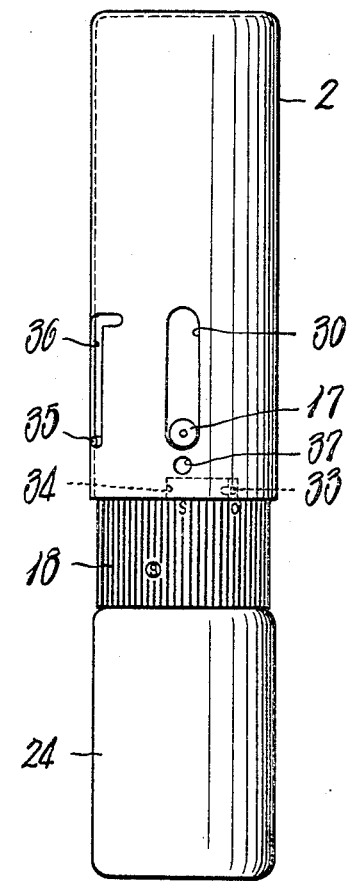

(a)

(b)

(c)

United States Patent Office 3,484,047
Patented Dec. 16, 1969

3,484,047
PORTABLE MINIATURE SPRAYER
Noboru Tanaka, Fujiidera-shi, Japan, assignor to
Kabushiki Kaisha Mitani Valve, Tokyo, Japan
Filed Aug. 2, 1967, Ser. No. 657,968
Claims priority, application Japan, Feb. 2, 1967,
42/6,728
Int. Cl. B05b 11/00, 9/08
U.S. Cl. 239—357
7 Claims

ABSTRACT OF THE DISCLOSURE

This disclosure relates to an invention in a portable miniature sprayer comprising a cylinder, a piston, an intermediate member, and a reservoir and having a cylindrical outer contour. It is possible to push the cylinder towards the piston and maintain the former in the pushed position. It is possible to rotate the piston on the intermediate member fixed to the reservoir to interrupt the interior of the reservoir from communication with a spraying port formed in the piston.

BACKGROUND OF THE INVENTION

Field of the invention

The field of art to which this invention belongs is that of portable liquid reservoirs.

Description of the prior art

In accordance with the prior art, in a sprayer a pumping means is contained inside a reservoir and a piston protrudes out of the reservoir to facilitate the pumping operation. However, such a construction is not suitable for a portable sprayer, because the protruded piston handle interferes with its portable character. It is also difficult in such a construction because the pumping means is almost inside the reservoir, to prevent the reservoir from leakage of its contents and/or to adjust the spraying action.

SUMMARY OF THE INVENTION

Briefly stated in accordance with one aspect of this invention, there is provided a portable miniature sprayer comprising a cylinder, piston, an intermediate member, and a reservoir. The intermediate member has a liquid passage and a gas passage is connected to the reservoir. The piston is set on the intermediate member in such a manner that the former is rotatable on but not removable from the latter. A nozzle is formed inside the piston to which the liquid contents may be introduced from the interior of the reservoir through the liquid passage and air confined inside the cylinder may be introduced by pushing the cylinder down toward the piston. In addition, the cylinder may be maintained in the pushed down position so as to reduce the full height of the sprayer and the piston may be turned on the intermediate member so as to interrupt the liquid passage and the air passage and hide the nozzle behind the cylinder.

By virtue of the construction as above, there is no particularly protruded portion in the contour of the sprayer which has a compact appearance without any handle or knob. No leakage of the contents of the reservoir can occur, whereby its portable nature is further enhanced. Sucking action is caused by the pressured air passing through the nozzle so that the latter cannot clog. In addition, it is possible to maintain a position where the full length is reduced and the nozzle is hidden behind the outer wall, aiding the portability of the device and also preventing the nozzle from clogging.

BRIEF DESCRIPTION OF THE DRAWING

For purposes of illustration preferred embodiments of this invention are shown in the accompanying drawings in which:

FIGS. 1(a), 1(b), and 2 show the first embodiment, in which FIG. 1(a) is an axially sectional front view, FIG. 1(b) is a cross-sectional view taken along the line b—b of FIG. 1(a), and FIG. 2 shows the compressed position where the full length is reduced and the nozzle is hidden behind the outer wall;

FIG. 4 shows the external form of the first embodiment which is common with the second embodiment;

FIGS. 5, 6(a), and 6(b) show the third embodiment, in which FIG. 5 shows the active position, FIG. 6(a) shows the inactive position, and FIG. 6(b) is a cross-sectional view taken along the line b—b of FIG. 6(a);

FIGS. 7, 8, 9, 10(a), 10(b), 11(a), 11(b), 12(a), 12(b) and 12(c) show the fourth embodiment, in which FIG. 7 shows the active position, FIG. 8 shows the compressed position, FIG. 9 shows the turned position, FIG. 10(a) and 10(b) is an exploded view of the piston and the intermediate member, FIG. 11(a) is a bottom view of the piston, FIG. 11(b) is a top plan view of the intermediate member, FIG. 12(a) shows the appearance of the fourth embodiment in the active position, FIG. 12(b) shows the similar appearance to FIG. 12(a) but in the turned position, and FIG. 12(c) shows the compressed position;

FIGS. 13(a), 13(b), and 13(c) show the fifth embodiment, in which FIG. 13(a) is a bottom view of the piston, FIG. 13(b) is a top plan view of the intermediate member, and FIG. 13(c) is an axially sectional view of the intermediate member taken along the line c—c of FIG. 13(c);

Similar numerals refer to similar parts throughout the several views.

DESCRIPTION OF THE PREFERRED EMBODIMENTS

Referring more particularly to the drawings, the preferred embodiments of this invention will now be described; however, this description will be understood to be illustrative of the invention and not as limiting it to the particular constructions shown and described. A portable miniature sprayer embodiment in accordance with this invention comprises a cylinder 2, a piston 1, an intermediate member 18, and a reservoir 24.

Figure 1:
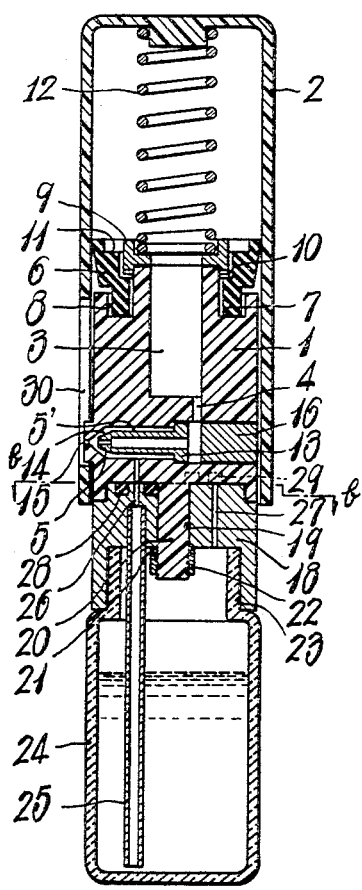
Figure 2:
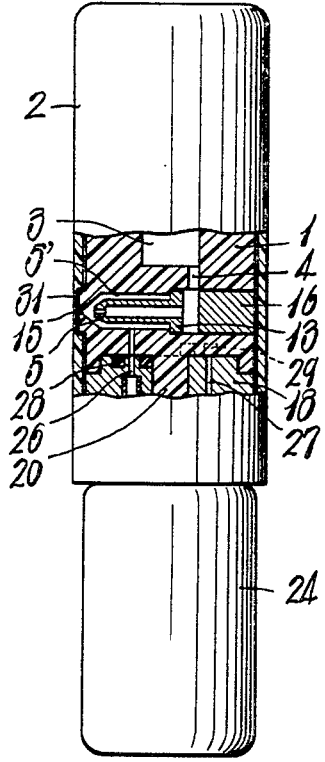

In the first embodiment shown in FIGS. 1(a), 1(b) and 2, a piston 1 made of a synthetic resin is provided with an top-opened axial concentric pit 3. An axial vent hole 4 is downward extended from the axial pit 3 in the piston 1 to communicate the interior of the pit 3 with a nozzle 5 which will be referred to in detail hereinafter. There is a circular groove 8 on the top of the piston 1. In the circular groove 8 is arranged a valve body 6 which is shaped as a bottomless cup and made of an elastic material such as synthetic resin, rubber, or the like. The bottom protrusion 7 of the valve body 6 is adapted to be engaged with the circular groove 8 of the piston 1. The valve body 6 extends upwardly above the top of the piston 1 and the top of the valve body 6 expands radially so as to fit closely with the inside wall of the cylinder 2. A lower circular shoulder 10 is formed on the inside wall of the valve body 6. A flat ring 9 is arranged on the top of the piston 1 and has an outer periphery with an upward flange and a downward flange. The downward flange is adapted to face the lower shoulder of the valve body 6 for holding it in position after the ring 9 has been secured to the piston 1. An upper circular shoulder 11 is also formed in the inside wall of the valve body 6, whereby the valve body 6 is made thinner in the upper part thereof so as to be more flexible at that part to facilitate bringing the outer wall of the upper part into contact with the inner wall of the cylinder 2. It is necessary to space the valve body 6 from the circular groove 8 so that the valve body 6 is somewhat movable. When the cylinder 2 is raised by the action of a spring 12 compressed between the inner wall of the top of the cylinder 2 and the upper surface of the flat ring 9, the valve body 6 is also slightly raised following the cylinder 2 so as to form a clearance between the valve body 6 and the circular groove 8, through which air is drawn into the space inside the cylinder 2.

The piston 1 is provided with a radial through bore 14. An end of the through bore 14 is tapered in the proximity of the cylindrical surface of the piston 1 to form a spraying port 15. The intermediate radial wall of the through bore 14 is provided with a circular shoulder whereby the through bore 14 is somewhat larger at the other end thereof. The nozzle 5 is composed of a cylindrical member 5' having a flanged tail 13 adapted to be engaged with the intermediate circular shoulder of the through bore 14 whereby the nozzle 5 is held inside the through bore 14 and spaced from a section of the wall thereof. One end of the cylindrical member 5' having the outward flange 13 is provided with a stopper 16 closing the through bore 14 at the other end thereof. The vent hole 4 of the piston 1 extends downwardly into the stopper 16 so as to communicate the vent hole 4 with the interior of the nozzle 5. The head of the cylindrical member 5' of the nozzle 5 is tapered to form a jetting port which is spaced inside the spraying port 15 of the piston 1 and arranged coaxially therewith. The piston 1 has an axial downwardly evtending stem 20 which is adapted to be inserted into an axial through bore 19 of the intermediate member 18 having the same diameter as the piston 1.

The intermediate member 18 is arranged between the piston and the reservoir 24. The piston 1 is adapted to be set on the intermediate member 18, the stem 20 being inserted into the through bore 19 while a peripherally-shouldered top of the intermediate member 18 is received by peripherally-flanged bottom of the piston 1. The through bore 19 receives the stem 20 which has a threaded end with which a nut 22 is engaged so as to carry the piston 1 on the intermediate member 18 in such a manner that the former is rotatable on but not removable from the latter. A gasket 21 is arranged between the top of the nut 22 and the bottom of the intermediate member 18. The intermediate member 18 has a lower flange 23 along the periphery thereof which is adapted to be engaged with and fixed to the mouth of the reservoir 24 by conventional means. The intermediate member 18 is provided with a suction pipe 25 extending downwardly to the proximity of the bottom of the reservoir 24. The top end of the suction pipe 25 extends into a liquid passage 26 which extends through the intermediate member 18 and the piston 1 up to the inside space of the radial bore 14. The intermediate member 18 is also provided with a gas passage 27 extending through the intermediate member 18. Numeral 28 represents a ring gasket arranged on the top of the intermediate member 18 around the liquid passage 26 to keep the latter liquid-proof. Numeral 29 represents a ring gasket arranged on the bottom of the piston 1 in such a manner that the ga spassage 27 is kept gas-proof when the piston 1 is turned to the inactive position on the intermediate member 18. When the piston 1 is turned to the active position on the intermediate member 18, the gas passage 27 may be communicated with the atmosphere to pass air into the reservoir 24 as shown in FIG. 1(b).

In operation, the cylinder 2 is pushed down toward the piston 1 against the action of the spring 12 so that the peripheral surface of the intermediate member 18 is covered by the skirt of the cylinder 2. By pushing down the cylinder 2 as above, the air confined inside the cylinder 2 is expelled, passing through the pit 3, vent hole 4, the interior of the nozzle 5, and the spraying port 15. Meantime, the elastic valve body 6 is in contact with the inside wall of the cylinder 2 to prevent leakage of air through the clearance between the piston 1 and the cylinder 2. By the action of the vacuum around the nozzle 5 caused by the air jetted through the jetting port of the nozzle 5 toward the spraying port 15, the liquid contained inside the reservoir 24 is drawn toward the spraying port 15, passing through the suction pipe 25 and the liquid passage 26, so that the liquid is externally sprayed through the spraying port 15.

The cylinder 2 is provided with a vertical elongated aperture 30 through which a part 14 around the spraying port 15 of the outer surface of the piston 1 protrudes so as to guide the vertical motion of the cylinder 2 on the piston 1. The top end of the long aperture 30 extends circumferentially into an inside groove 31 provided on the inside wall of the cylinder 2 for guiding the protruding part circumferentially as shown in FIG. 4, so that, when the cylinder 2 is lowered to its lowermost position, it is possible to rotate the cylinder 2 on the piston 1. When the cylinder 2 is rotated on the piston 1, it is possible to maintain the full height of the sprayer in the compressed state for facilitating its portability. In the inactive position as above, the gas passage 27 communicates with the atmosphere as described hereinbefore. Of course, the ring gasket 28 is always maintained around the liquid passage 26 to prevent leakage of liquid because the ring gasket 28 is fixed on the top of the intermediate member 18.

Figure 3:
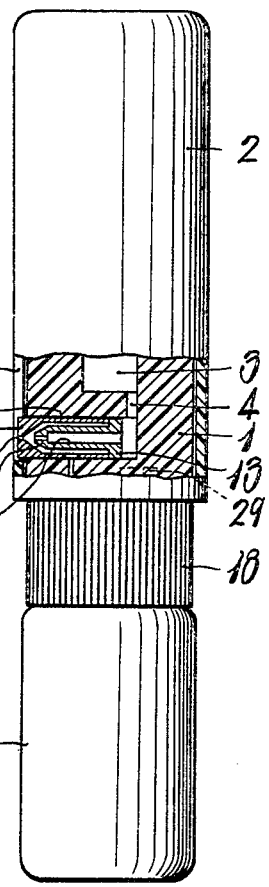
FIG. 3 shows the second embodiment which resembles substantially the first embodiment except around the nozzle.
Figure 1:
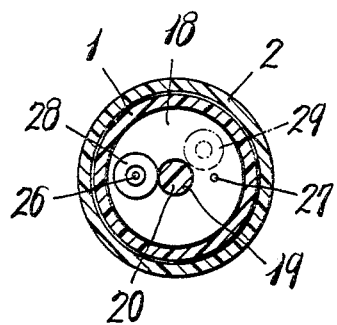
Figure 12:
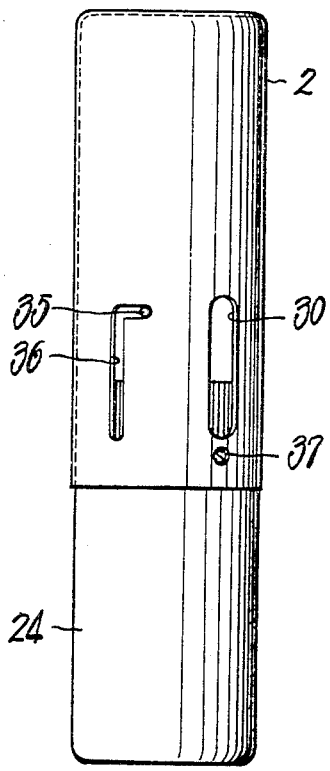

The second embodiment shown in FIGS. 3 and 4 is very similar to the first embodiment. In this second embodiment, the stopper 16 is integral with the piston 1 and an outer spraying member 17 having the spraying port 15' provided around the nozzle 5. The outer spraying member 17 is fixed to the piston 1 and protrudes into the long aperture 30 similarly to that in the preceding example.

FIGS. 5, 6(a) and 6(b) show the third embodiment in which the piston 1 is held on the intermediate member 18 by a tubular, peripheral extension 43 on the piston 1 which rotatably engages a circumferential groove 42 in the intermediate member 18. The piston 1 is brought into this engagement by virtue of the elasticity of the material, and this arrangement is substituted for the engagement of the stem 20 in the through bore 19 in the preceding example.

Formed in the bottom surface of the piston 1 are two small pits in which small balls 39 and 40 are downwardly spring-loaded and adapted to close the liquid passage 26 and the gas passage 27, respectively, when the sprayer is in the turned position, as shown in FIGS. 6(a) and 6(b). In the active position, the liquid passage 26 is connected with an extension 26' formed in the piston 1 while leakage through the clearance between the piston 1 and the intermediate member 18 is prevented by the ring gasket 28 similar to the preceding embodiment. In this position, the gas passage 27 is free from the ball closing means 40, as shown in FIG. 5.

FIGS. 7 through 12(c) illustrate the fourth embodiment of this invention. The top periphery 32 of the intermediate member 18 of this embodiment has a radial pin 33 which is adapted to be engaged with a notch 34 formed in the peripheral axially extended skirt at the bottom of the piston 1 to limit the rotation of the piston 1 on the intermediate member 18 as best shown in FIGS. 10(a) and 10(b). In the position shown in FIGS. 7 and 8, the suction pipe 25 is in communication with the interior of the spraying member 17, but the communication is interrupted at the bottom surface of the piston 1 in the position shown in FIG. 9 after the piston 1 has been rotated on the intermediate member 18. The cylinder 2 is provided with an inverted L-shaped slot 36 through which a pin 35 protrudes radially from the cylindrical surface of the piston 1 so as to indicate the position of the cylinder 2 relative to the piston 1. There are three marks on the cylindrical surface of the intermediate member 18. One of the three marks, "O," is positioned just under the spraying port 15 when the above-mentioned communication has been established. Another mark, "S," is positioned similarly, when the communication has been broken. Still another mark, "S in a circle," is positioned to be hidden by the cylinder 1, if an aperture 37 is not provided, when the communication has been broken. The aperture 37 is positioned just under the long aperture 30, so that the "S in a circle" mark is exposed in the aperture 37 when the cylinder 2 has been pushed town toward the piston 1 and the piston 1 has been turned on the intermediate member 18 to the limited position. By this means, it is possible to externally indicate the active condition and the inactive condition of the sprayer.

Figure 13:
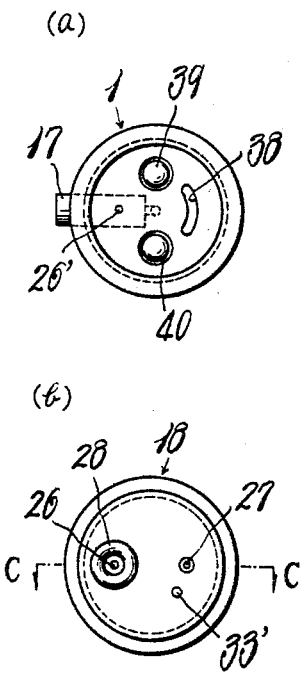

In the fifth embodiment shown in FIGS. 13(a), 13(b) and 13(c), a boss 33' is provided on the top of the intermediate member 18 and adapted to be engaged with an arched groove 38 formed on the bottom of the piston 1 the boss 33' and the arched groove 38 replaces the pin 33 and the notch 34 in the structure of the fourth embodiment. It is necessary to locate the boss 33' and the arched groove 38 so as not to interfere with the location of the liquid passage 26 and the gas passage 27.

Figure 14:
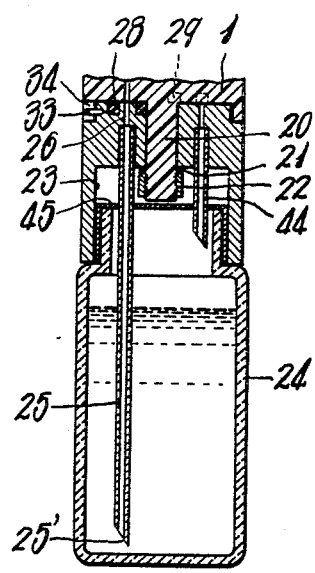
FIG. 14 shows the sixth embodiment.

In the sixth embodiment shown in FIG. 14, the ball 40 in the third embodiment is replaced by a cup-like element 41 of an elastic material.

Figure 15:
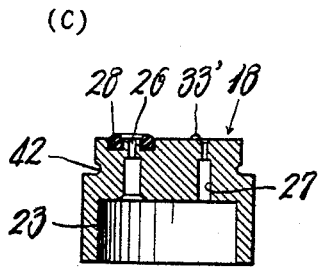
FIG. 15 shows the seventh embodiment.

In the seventh embodiment shown in FIG. 15, the bottom of the suction pipe 25 and the downward extension 44 of the gas passage are sharpened so that, when the reservoir 24 is capped and sealed by an impermeable film 45, it is possible to engage the intermediate member 18 with the reservoir 24 and concurrently pierce the film 45 by the pipe ends 25' and 44, whereby a volatile liquid may be kept from escaping due to the evaporation during the engagement operation.

In any of these embodiments, it is possible to form a small passage extending through the piston 1 to communicate the pit 5 with the gas passage 27 of the intermediate member 18. It is also possible to eliminate the upper circular shoulder 11 of the valve body 6 as shown in FIGS. 5, 6(a) and 6(b). To this end, the peripheral downward flange of the flat ring 9 is made thick. However, such a modification is not so effective but somewhat affects the manner in which the valve body 6 fits on the inner wall of the cylinder 2.

What is claimed as new and desired to be secured by Letters Patent of the United States is:

1. A portable miniature sprayer comprising a cylinder, a piston, an intermediate member, and a reservoir,
    said reservoir being adapted to contain a liquid therein and having a liquid passage and a gas passage,
    said intermediate member being removably fixed on said reservoir and having extensions of said passages, respectively,
    said piston being set only rotatably on said intermediate member and having a nozzle,
    said cylinder being adapted to be slid axially on said piston so as to suck air into a space inside said cylinder and compress and admit said air into said nozzle through a vent hole formed in said piston,
    an elastic valve body set on said piston and in close contact with the inner wall of said cylinder in such a manner that, when said cylinder is drawn away from said piston, said valve body lifts from the top of said piston so as to form a clearance between said valve body and said piston top for drawing external air into the interior of said cylinder,
    said nozzle jetting said compressed air so as to reduce pressure at another space around said nozzle, and
    said another space being adapted to be communicated with said extension of said liquid passage so as to suck said liquid to said another space and spray it with said air when said sprayer is in an active position while said communication is interrupted between said piston and said intermediate member by rotating the former on the latter into a turned position where said cylinder is made nearest to said piston and kept inactive.

2. A portable miniature sprayer as claimed in claim 1, in which:
    said nozzle is adapted to be hidden behind a wall of said cylinder when said cylinder is lowered toward said piston which is then turned on said intermediate member so as to bring said sprayer into its inactive position.

3. A portable miniature sprayer as claimed in claim 1, in which:
    said intermediate member is provided with a protruded element adapted to be engaged with a limitatively shaped hole formed in said piston for guiding said piston in a limited rotation thereof on said intermediate member.

4. A portable miniature sprayer as claimed in claim 1, in which:
    a leak-preventing means is provided for said liquid and gas passages between said piston and said intermediate member,
    said leak-preventing means for said liquid passage comprising a first seal ring in a groove in said intermediate member around said liquid passage and contacting a mating face of said piston,
    said leak-preventing means for said gas passage comprising a second seal ring in a groove in the rotatable piston and disposed around said gas passage when the piston is turned to said inactive position and contacting a mating face of said piston,
    said second seal ring being displaced from its position around said gas passage when the piston is rotated to an active position.

5. A portable miniature sprayer:
    comprising a cylinder, a piston, an intermediate member, and a reservoir,
    said reservoir being adapted to contain a liquid therein and having a liquid passage and a gas passage,
    said intermediate member being removably fixed on said reservoir and having extensions of said passages, respectively,
    said piston being set only rotatably on said intermediate member and having a nozzle,
    said piston being provided with a radial bore communicating with said liquid passage when said sprayer is in its active position,
    said nozzle being arranged in spaced relationship from and in said radial bore by means of a flange on said nozzle so as to provide a space,
    said nozzle being arranged radially coaxial with a spraying port formed in said piston which communicates said space with the exterior,
    said cylinder being adapted to be slid axially on said piston so as to suck air into a space inside said cylinder and compress and admit said air into said nozzle through a vent hole formed in said piston,
    said nozzle jetting said compressed air so as to reduce pressure at another space around said nozzle, and
    said another space being adapted to be communicated with said extension of said liquid passage so as to suck said liquid to said another space and spray it with said air when said sprayer is in an active position while said communication is interrupted between said piston and said intermediate member by rotating the former on the latter into a turned position where said cylinder is made nearest to said piston and kept inactive.

6. A portable miniature sprayer:

comprising a cylinder, a piston, an intermediate member, and a reservoir, said reservoir being adapted to contain a liquid therein and having a liquid passage and a gas passage, said intermediate member being removably fixed on said reservoir and having extensions of said passages, respectively, said piston being set only rotatably on said intermediate member and having a nozzle, said piston being provided with an axial concentric stem which is adapted to be rotatable in an axial concentric through bore formed in said intermediate member for keeping said piston only rotatable on said intermediate member, said cylinder being adapted to be slid axially on said piston so as to suck air into a space inside said cylinder and compress and admit said air into said nozzle through a vent hole formed in said piston, said nozzle jetting said compressed air so as to reduce pressure at another space around said nozzle, and said another space being adapted to be communicated with said extension of said liquid passage so as to suck said liquid to said another space and spray it with said air when said sprayer is in an active position while said communication is interrupted between said piston and said intermediate member by rotating the former on the latter into a turned position where said cylinder is made nearest to said piston and kept inactive.

7. A portable miniature sprayer:

comprising a cylinder, a piston, an intermediate member, and a reservoir, said reservoir being adapted to contain a liquid therein and having a liquid passage and a gas passage, said intermediate member being removably fixed on said reservoir and having extensions of said passages, respectively, said intermediate member having a knurled cylindrical outer surface, at least one mark on said surface adapted to be externally seen through a perforation formed in the wall of said cylinder when the latter is lowered to the lowermost position, said piston being set only rotatably on said intermediate member and having a nozzle, said cylinder being adapted to be slid axially on said piston so as to suck air into a space inside said cylinder and compress and admit said air into said nozzle through a vent hole formed in said piston, said nozzle jetting said compressed air so as to reduce pressure at another space around said nozzle, and said another space being adapted to be communicated with said extension of said liquid passage so as to suck said liquid to said another space and spray it with said air when said sprayer is in an active position while said communication is interrupted between said piston and said intermediate member by rotating the former on the latter into a turned position where said cylinder is made nearest to said piston and kept inactive.

References Cited

UNITED STATES PATENTS

| | | | |
|---|---|---|---|
| 2,624,621 | 1/1953 | Peeps | 239—357 X |
| 2,853,343 | 9/1958 | Bamberger et al. | 239—357 X |
| 3,008,651 | 11/1961 | Follain | 239—357 X |
| 3,040,991 | 6/1962 | Fedit | 239—359 X |

EVERETT W. KIRBY, Primary Examiner

U.S. Cl. X.R.

239—351, 359